Patented May 16, 1939

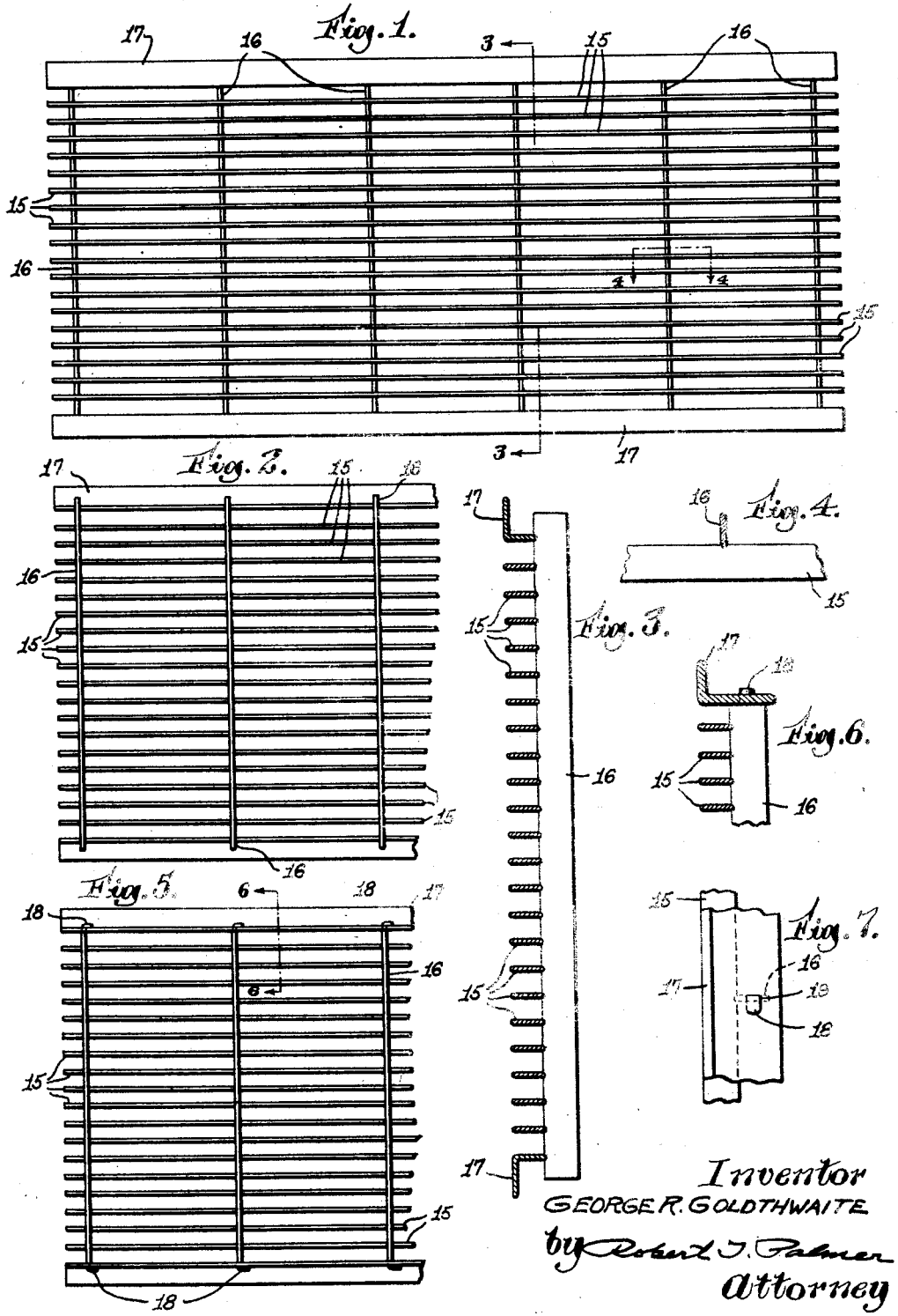
May 16, 1939. G. R. GOLDTHWAITE 2,158,229
GRILLE MAKING APPARATUS
Filed March 4, 1938 — 2 Sheets-Sheet 1
Inventor
GEORGE R. GOLDTHWAITE
by Robert J. Palmer
Attorney

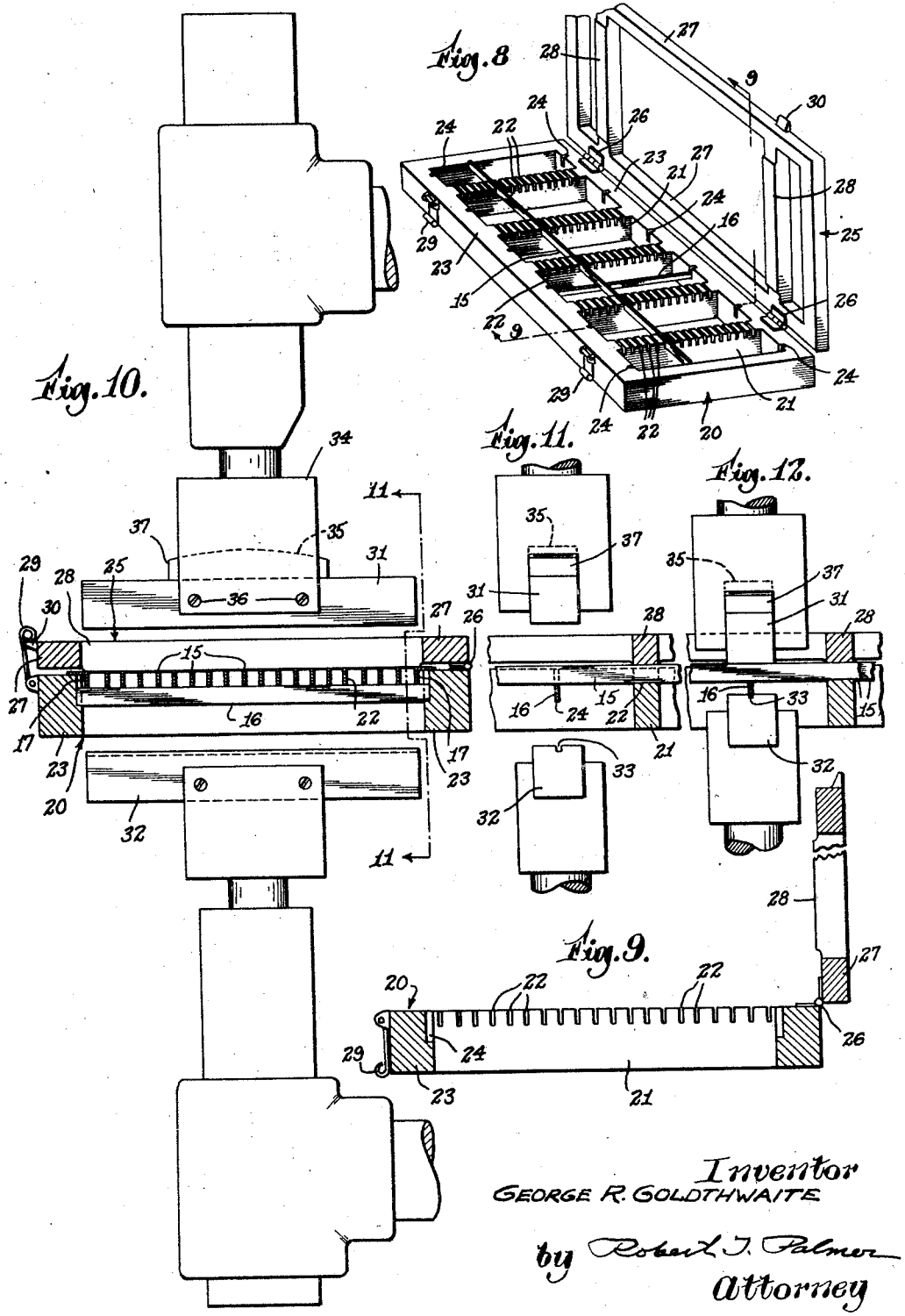

2,158,229

UNITED STATES PATENT OFFICE 2,158,229

GRILLE MAKING APPARATUS

George R. Goldthwaite, South Easton, Mass., assignor to B. F. Sturtevant Company, Boston, Mass.

Application March 4, 1938, Serial No. 193,937

8 Claims. (Cl. 219—4)

This invention relates to grilles and relates more particularly to welded grilles and to methods and apparatus for constructing the same.

One form of grille to which this invention relates is a grille for air conditioning purposes. Such a grille is defined in the 15th edition of the American Society of Heating and Ventilating Engineer's Guide as: "A perforated covering for an air inlet or outlet usually made of wire screen, pressed steel, cast iron or plaster. Grilles may be plain or ornamental."

According to this invention, a grille is formed from a plurality of relatively long and relatively narrow and relatively thin, longitudinal metal bars or strips which are welded to a lesser number of similar but relatively short transversely extending metal strips. In one and the preferred embodiment of the invention, metal strips formed as angles are also welded to the ends of the transverse strips to form the longitudinal borders of the grille. Each cross-member is welded to all of the longitudinal strips in one welding operation resulting in the economic production of the grilles in quantity.

An object of the invention is to provide a grille formed from welded longitudinal and transverse metal strips.

Another object of the invention is to weld a plurality of longitudinal metal strips simultaneously to a transverse metal strip.

Another object of the invention is to provide apparatus for economic, quantity production of welded grilles.

Other objects of the invention will be apparent from the following description taken together with the drawings.

The invention will now be described with reference to the drawings, of which:

Fig. 1 is a front elevation of one embodiment of a grille according to this invention;

Fig. 2 is a rear elevation of the grille of Fig. 1;

Fig. 3 is a sectional view along the lines 3—3 of Fig. 1;

Fig. 4 is a sectional view along the lines 4—4 of Fig. 1;

Fig. 5 is a front elevation of another embodiment of the invention, similar to that of Fig. 1 but in which the angles are attached to the transverse strips otherwise than by welding;

Fig. 6 is a sectional view along the lines 6—6 of Fig. 5;

Fig. 7 is a plan view looking downwardly upon the grille of Fig. 6;

Fig. 8 is an isometric view of one embodiment of a frame according to this invention for use in forming a welded grille.

Fig. 9 is a sectional view along the lines 9—9 of Fig. 8;

Fig. 10 is a view in elevation of the frame of Figs. 8 and 9 and of the welding electrodes, with the electrodes in non-welding position;

Fig. 11 is a sectional view along the lines 11 of Fig. 10, and

Fig. 12 is a view similar to that of Fig. 11 but with the electrodes in welding position.

The grille of Figs. 1 to 4 inclusive, is made up from the plurality of longitudinal metal strips 15, the two angles 17, and the transverse strips 16, which are spot welded to the back sides of the strips and angles. The cross-sectional area of each strip 15 and 16 and of the leg of each angle 17 to which the strips 16 are welded should be substantially the same. When these cross-sectional areas are substantially the same, the grilles may be quickly and economically welded on a quantity production basis. When these cross-sectional areas are substantially different, it is difficult to economically construct the grilles in quantity production for the reason that the welding is not uniform and individual longitudinal strips have to be re-welded with resulting expense.

The grille of Figs. 5 to 7 inclusive, is similar to that of Figs. 1 to 4 inclusive except that the angles 17 are not welded to the transverse strips 16 but are perforated at 19 to receive the extended ends 18, of the strips 16, which extend through the legs of the angles 17 and which are bent over to retain the angles in place. This form of grille may be preferred as where it is desired to have angles with substantially greater cross-sections than the transverse strips.

The method of and one embodiment of apparatus for constructing grilles according to this invention will now be described with reference to Figs. 8 to 12 inclusive. The form 20 contains the plurality of spaced cross ribs 21, each of which contain a plurality of longitudinal slots 22, corresponding ones of which are in alignment. The slots 22 have a width slightly greater than that of the strips 15 which they are adapted to receive. The side bars 23 of the form 20 have the vertical slots 24, corresponding ones of which are adapted to receive the transverse strips 16. The slots 22 and 24 cooperate to space, align and maintain the strips in their desired positions for welding. Fig. 8 discloses one longitudinal strip 15 and one transverse strip 16 held in their proper positions by the slots 22 and 24 respectively.

Associated with the form 20 is the frame 25 which in the embodiment illustrated is attached by the hinges 26 to the form 20. The frame 25 has the cross members 28 and the longitudinal members 27 which, when the frame 25 is lowered to its proper position upon the form 20, press upon the portions of the grille assembly for the purpose of holding them in position to prevent displacement during the welding operation. The cross members 28 press upon the upper surfaces of the longitudinal strips 15 in areas between the transverse strips so as to provide space for the upper electrode of the welding apparatus to rest upon the upper surface of the strips 15 just above the transverse strips 16. The longitudinal members 27 of the frame 25 rest upon and maintain the angles 17 of the grille in their proper position during the welding operation. The frame 25 is held in its down position by means of the catches 29, on the form 20, which engage the tongues 30 on the frame 25.

Referring now to Figs. 10 to 12 inclusive, the upper electrode 31 and the lower electrode 32 of the electric welder are given widths sufficient to enable the upper electrode to contact simultaneously with the upper surfaces of all of the strips 15 and the angles 17 (when welded), and to enable the lower electrode to contact with all of the lower surface of one of the transverse strips 30 which extends between the strips 15 (and the angles 17 when welded). This enables all of the strips 15 and the angles 17 (when welded) to be welded in one operation to one transverse strip 16.

The lower electrode 32 is provided with the slot 33 for receiving the transverse strips 16.

The upper electrode 31 is held in position in the slot 35 in the holder 34 by the screws 36. The leveling block 37 spaces the electrode 33 from the upper edge of the slot 35 and serves to so level and align the upper electrode 31 with the surfaces of the strips 15 and 16 and of the lower electrode 32 that equal pressure is exerted at all of the welding points when the electrodes are forced together. This leveling step will be explained later in this description.

In constructing a grille, the frame 25 is separated from the forms 20 as shown by Fig. 8. Transverse strips 16 are placed in the slots 24. Then the strips 15 are placed in all of the slots 22 except those in the single row adjacent each of the side bars 23, which rows receive legs of the angles 17 when the angles are welded. The depths of the slots are so arranged that the lower portions of the strips 15 rest upon the upper surfaces of the strips 16 and so that the strips 15 may be pressed tightly against the strips 16 by the electrodes during the welding operation. When all of the elements of the grille have been placed in the form 20, the frame 25 is lowered upon it and secured by the clasps 29 clamping over the tongues 30.

The electrodes 31 and 32 are then separated so that the upper electrode may be properly aligned with the lower electrode. The screws 36 in the holders 34 are loosened; the electrodes 31 and 32 are brought together, and the leveling block 37 is then moved back and forth (to the left and to the right facing the drawings) until the lower surface of the electrode lines up with the upper surface of the lower electrode. When this is accomplished, the screws 36 are tightened and the apparatus is ready for welding. The form 20 is then placed on the lower electrode with one of the transverse strips 16 resting in the slot 33. The electrodes are brought together to press the strips 15 and one of the strips 16 tightly together and the welding current is applied. This results in the strip 16 being spot welded to all of the strips 15 and to the angles 17 (when welded) in one operation. The form 20 is then advanced through the welder to weld each of the strips 16 to the rows of strips 15. When the grille is relatively short, the form 20 may be advanced manually through the welder. When it is relatively long, it may be advanced from one well known table or conveyer, through the welder and onto another corresponding table or conveyer, these devices being arranged, of course, to feed the work through the welder, in a level horizontal plane. The form 20 may be moved through the welder manually or automatically with this movement synchronized with the action of the welder.

More than one set of electrodes could of course, be provided and all of the transverse strips 16 could be welded simultaneously to the strips 15. This may be desirable in extremely large scale production.

This invention provides a strong, rugged grille of pleasing appearance at just about one-fifth of the cost of labor and material required for grilles of comparative characteristics which it has replaced.

While one embodiment of the invention has been described for the purpose of illustration, it should be understood that the invention is not limited to the exact apparatus and arrangement of apparatus described; as many departures may be suggested by those skilled in the art, without departing from the spirit of the invention.

What is claimed is:

1. Welding apparatus comprising an electrode having a longitudinal slot for receiving a metal strip for welding, an opposing electrode adapted to press a plurality of transversely arranged metal strips against said strip, a holder for said opposing electrode, means for holding said opposing electrode in said holder, and aligning means for adjusting said opposing electrode for exerting equal pressure upon all of said transversely arranged strips.

2. Welding apparatus comprising an electrode having a longitudinal slot for receiving a metal strip for welding, an opposing electrode adapted to press a plurality of transversely arranged metal strips against said strip, a holder having a slot for receiving said opposing electrode, means for holding said opposing electrode in the slot in said holder and aligning means in said slot in said holder and between the ends of said opposing electrode and of said slot in said holder for adjusting said opposing electrode for exerting equal pressure upon all of said transversely arranged strips.

3. Welding apparatus comprising an electrode having a longitudinal slot for receiving a metal strip for welding, an opposing electrode adapted to press a plurality of transversely arranged metal strips against said strip, a holder having a slot for receiving said opposing electrode, means for holding said opposing electrode in the slot in said holder, a leveling block in said slot in said holder and between the ends of said opposing electrode and of said slot in said holder for adjusting said opposing electrode for exerting equal pressure upon all of said transversely arranged strips.

4. Welding apparatus comprising a form, a plurality of transverse members in said form, said members having a plurality of corresponding slots for receiving longitudinal metal strips, and a pair of longitudinal members, one on each side of said transverse members, said longitudinal members containing corresponding slots for receiving transverse metal strips for welding to said longitudinal strips.

5. Welding apparatus comprising a form, a plurality of transverse members in said form, said members having a plurality of corresponding slots for receiving longitudinal metal strips, and a pair of longitudinal members, said longitudinal members containing corresponding slots for receiving transverse metal strips for welding to said longitudinal strips, said slots in said longitudinal members being arranged below said slots in said transverse members.

6. Apparatus for welding metal strips comprising a form having an upper and a lower portion, a plurality of transverse members in said lower portion, said members having a plurality of corresponding slots for receiving longitudinal metal strips, a pair of longitudinal members, one on each side of said transverse members, said longitudinal members containing corresponding slots for receiving transverse metal strips for welding to said longitudinal strips, and means on said upper portion for holding the said longitudinal strips in said form.

7. Welding apparatus comprising a form, means in said form providing a plurality of groups of slots for receiving longitudinal metal strips, and means in said form providing a plurality of slots extending at right angles to the slots in said groups for receiving transverse metal strips for welding to said longitudinal strips.

8. Apparatus for welding metal strips comprising a form having two portions adapted to be placed together when said strips are in position for welding and adapted to be separated for receiving said strips for preparation for welding, means in one of said portions for holding a plurality of said strips in parallel spaced position and for holding another plurality of said strips in contact with and at substantially right angles to said first mentioned plurality of strips, and means in the other of said portions for preventing displacement of said strips when said portions are placed together.

GEORGE R. GOLDTHWAITE